United States Patent
Shona

(10) Patent No.: US 6,299,069 B1
(45) Date of Patent: Oct. 9, 2001

(54) INTEGRATED CIRCUIT FOR EMBEDDING IN SMART CARDS, AND METHOD OF ISSUING SMART CARDS

(75) Inventor: Yoshihiro Shona, Tokyo (JP)

(73) Assignee: Oki Electric Industry Co. Ltd., Tokyo (JP)

(*) Notice: Subject to any disclaimer, the term of this patent is extended or adjusted under 35 U.S.C. 154(b) by 0 days.

(21) Appl. No.: 09/210,458

(22) Filed: Dec. 14, 1998

(30) Foreign Application Priority Data

Dec. 26, 1997 (JP) .................................... 9-358977

(51) Int. Cl.[7] ................................................ G06K 19/06
(52) U.S. Cl. ........................................ 235/492; 235/382.5
(58) Field of Search ................................ 235/492, 375, 235/380, 382.5, 451, 382, 487; 902/26

(56) References Cited

U.S. PATENT DOCUMENTS

| | | | | |
|---|---|---|---|---|
| 5,120,939 | * | 6/1992 | Claus et al. | 235/382 |
| 5,225,664 | * | 7/1993 | Iijima | 235/380 |
| 5,497,418 | * | 3/1996 | Kudelski | 380/5 |
| 5,533,123 | * | 7/1996 | Force et al. | 380/4 |
| 5,542,081 | * | 7/1996 | Geronimi | 235/380 X |
| 5,825,882 | * | 10/1998 | Kowalski et al. | 235/380 X |
| 5,914,471 | * | 6/1999 | Van De Pavert | 235/380 |

FOREIGN PATENT DOCUMENTS

| | | |
|---|---|---|
| 0481936 A1 | 2/1991 | (EP) . |
| 0596276 A2 | 10/1993 | (EP) . |
| 2698195 | 11/1992 | (FR) . |
| 3-224083 | 10/1991 | (JP) . |

* cited by examiner

Primary Examiner—Karl D. Frech
(74) Attorney, Agent, or Firm—Rabin & Berdo, P.C.

(57) ABSTRACT

An integrated circuit embedded in a smart card has a rewritable non-volatile memory in which an instruction file is stored. A control logic circuit in the integrated circuit converts random data into authentication data by executing instructions read from the instruction file, preferably by controlling a simplified data processing circuit having a shift register, an exclusive-OR logic circuit, and specialized bit operation circuits. A card issuer issuing smart cards including this integrated circuit writes different instruction files in different smart cards, thereby enhancing the security of the smart cards.

20 Claims, 8 Drawing Sheets

FIG.4

| NO. | INSTRUCTION CODE | COMMENT |
|---|---|---|
| 1 | 00010001 | SHIFT-REG←RAN0-1 |
| 2 | 00010110 | RAN0-1←RAN2-3 |
| 3 | 00100011 | 3-BIT SHIFT |
| 4 | 00110000 | BIT REPLEACE |
| 5 | 01000000 | BIT INVERT |
| 6 | 01011000 | SHIFT-REG←KEY4-5 XOR SHIFT-REG |
| 7 | 00011000 | RAN2-3←SHIFT-REG |
| 8 | 00010001 | SHIFT-REG←RAN0-1 |
| 9 | 00010111 | RAN0-1←RAN4-5 |
| 10 | 00100101 | 5-BIT SHIFT |
| 11 | 00110000 | BIT REPLEACE |
| 12 | 01000000 | BIT INVERT |
| 13 | 01011000 | SHIFT-REG←KEY4-5 XOR SHIFT-REG |
| 14 | 00011100 | RAN4-5←SHIFT-REG |
| 15 | 00010001 | SHIFT-REG←RAN0-1 |
| 16 | 00100111 | 7-BIT SHIFT |
| 17 | 00110000 | BIT REPLEACE |
| 18 | 01000000 | BIT INVERT |
| 19 | 01010010 | SHIFT-REG←KEY0-1 XOR SHIFT-REG |
| 20 | 00011100 | RAN0-1←SHIFT-REG |
| 21 | 11110000 | END |

| NO. | INSTRUCTION CODE | | COMMENTS |
|---|---|---|---|
| k | ......... | | ......... |
| k+1 | 01100000 | | IF BIT W OF SHIFT-REG="1" THEN JUMP +3 |
| k+2 | 00100011 | | 3-BIT SHIFT |
| k+3 | 01110000 | | JUMP +2 |
| k+4 | 00101000 | | 8-BIT SHIFT |
|  | 01010010 | | SHIFT-REG←KEY0−1 XOR SHIFT-REG |
|  | ......... 20 | | ......... |

FIG.8

| NO. | INSTRUCTION CODE | COMMENTS |
|---|---|---|
| ---- | ---- | ---- |
| k | 00010001 | SHIFT-REG←RAN0−1 |
| k+1 | 10000100 | SAVE-REG←SHIFT-REG (SAVE RAN0−1 DATA) |
| k+2 | 01010001 | SHIFT-REG←RAN0−1 XOR SHIFT-REG (SHIFT-REG←00h) |
| k+3 | 01010001 | SHIFT-REG←KEY0−1 XOR SHIFT-REG (SHIFT-REG←KEY0−1) |
| k+4 | 00110000 | BIT REPLACE |
| k+5 | 00010100 | RAN0−1←SHIFT-REG |
| k+6 | 10000100 | SHIFT-REG←SAVE-REG |
| k+7 | 01010001 | SHIFT-REG←RAN0−1 XOR SHIFT-REG (SHIFT-REG←RAN0−1 XOR MODIFIED KEY0−1) |
| ---- | ---- | ---- |

20

INTEGRATED CIRCUIT FOR EMBEDDING IN SMART CARDS, AND METHOD OF ISSUING SMART CARDS

BACKGROUND OF THE INVENTION

The present invention relates to an integrated circuit providing an authentication function in a smart card.

Conventional smart cards, also known as integrated-circuit cards, comprise an embedded integrated circuit such as a microcontroller having a central processing unit (CPU), a rewritable non-volatile data memory for storing data, and a masked read-only memory (ROM) for storing programs. In many smart cards, an authentication function is implemented by means of key data stored in the non-volatile data memory and an algorithm stored as a program in the masked ROM. Running on the CPU, the program uses the key data and other data, such as random-number data, to generate authentication data, which are then used to authenticate the identity of the card, or the identity of a host device with which the card communicates. A high degree of security can be provided by the use of long keys and complex algorithms. An integrated circuit comprising a CPU, however, has the disadvantages of being comparatively large and expensive.

If the CPU is not needed for other processing, an integrated circuit employing hard-wired logic for authentication can overcome these disadvantages, but the algorithms that can readily be implemented in hard-wired logic are limited in complexity, and do not provide a high level of security. Since a person who succeeds in penetrating a single card can sometimes compromise the security of an entire system, a system using cards with hard-wired authentication logic is at considerable risk.

Another problem with integrated circuits of both of the above types is that the authentication algorithm is unalterable, or at least, the algorithm cannot be altered easily. Alterations can be made only by modifying the photolithography masks used in manufacturing the integrated circuit, which is an expensive and time-consuming undertaking.

SUMMARY OF THE INVENTION

It is accordingly an object of the present invention to provide a small, inexpensive integrated circuit having a highly secure authentication function, for use in smart cards.

Another object of the invention is to provide a method of using the invented integrated circuit that enhances the security of the smart cards.

The invented integrated circuit has an interface circuit for external input and output of commands and data, an electrically rewritable non-volatile memory storing at least one instruction file having a list of instructions, and an authentication data generator having logic circuits for executing the instructions, thereby converting random data into authentication data. The integrated circuit may also have a random data generator for generating the random data. The rewritable non-volatile memory preferably stores key data as well as the instruction file.

In a preferred configuration, the authentication data generator has registers for storing the key data and random data, a data processing unit using the key data to perform operations on the random data, an instruction register, and a control logic circuit. The data processing unit has a shift register into which the random data can be transferred, a bit replacement circuit, a bit-inverting circuit, a selector for selecting key data or random data, and an exclusive-OR logic circuit operating on the selected data and the contents of the shift register. The control logic circuit reads instructions one by one from the instruction file into the instruction register, and executes the instructions by controlling the data processing unit, thereby generating the authentication data.

The data processing unit may also have a register for saving and restoring the shift-register contents. The control logic circuit may also have logic for conditionally skipping instructions in the instruction file, for unconditionally skipping instructions, and for executing no-operation instructions.

When the rewritable non-volatile memory stores two or more instruction files, these files can be selected according to external information received by the interface circuit. For example, one instruction file can be used in converting random data generated in the integrated circuit to authentication data, to authenticate a host device, and another instruction file can be used to convert random data received by the interface circuit, for authentication of the smart card in which the integrated circuit is embedded.

A preferred method of issuing smart cards in which the invented integrated circuit is embedded is to write different instruction files in different cards. No-operation instructions are preferably inserted into the instruction files, as necessary, to make all instruction files have the same length.

BRIEF DESCRIPTION OF THE DRAWINGS

In the attached drawings:

FIG. 4 shows a sample instruction file;

FIG. 7 shows part of an instruction file using jump instructions; and

FIG. 8 shows part of an instruction file using save and restore instructions.

DETAILED DESCRIPTION OF THE INVENTION

Two embodiments of the invention will be described with reference to the attached illustrative drawings.

Figure 1:
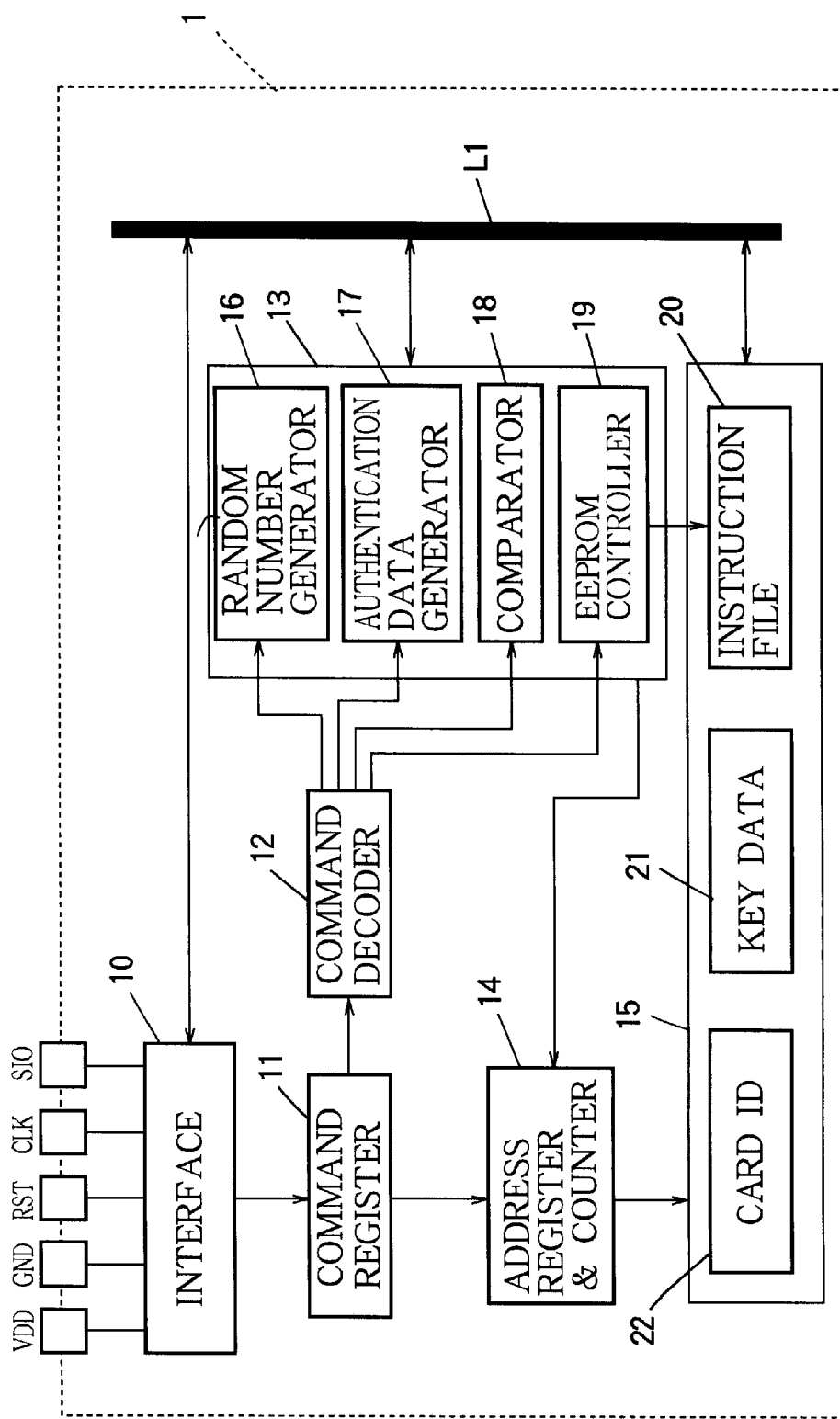
FIG. 1 is a block diagram of an integrated circuit according to two embodiments of the invention.

Referring to FIG. 1, both embodiments are integrated circuits 1 comprising an interface circuit 10, a command register 11, a command decoder 12, a command processor 13, an address register and counter 14, and a rewritable non-volatile memory, more specifically an electrical erasable and programmable read-only memory or EEPROM 15. The interface circuit 10, command processor 13, and EEPROM 15 are interconnected by an eight-bit data bus Li. The integrated circuit 1 also has the following external terminals: a power-supply (VDD) terminal, a ground (GND) terminal, a reset (RST) input terminal, a clock (CLK) input terminal, and a serial input-output (SIO) terminal.

The VDD and GND terminals connect to an external power supply that supplies a ground potential to the GND terminal and a positive potential to the VDD terminal. The RST terminal receives an external signal that resets the integrated circuit 1. The CLK terminal receives an external clock signal that synchronizes the internal operation of the integrated circuit 1. The SIO terminal is used for input and output of serial data signals.

The interface circuit 10 is coupled to the VDD, GND, RST, CLK, and SIO terminals, receives command codes and other information from a host device (not visible) via the SIO terminal, and when necessary, sends data and acknowledgment signals to the host device via the SIO terminal. The command register 11 stores the command codes received from the host device. The command decoder 12 decodes the command codes stored in the command register 11 to determine what processes must be carried out to execute the commands.

The command processor 13 comprises several circuit modules. Four of the modules concerned with authentication are a random data generator 16 that generates random data, an authentication data generator 17 that converts random data to authentication data, a comparator 18 that compares authentication data, and an EEPROM controller 19 that controls the EEPROM 15. Other modules (not visible) transfer data between the interface circuit 10 and command processor 13 on the eight-bit data bus LI, and may perform various other tasks depending on the purpose for which the integrated circuit 1 is used. The modules in the command processor 13 are constructed from random logic; that is, they comprise low-level circuit elements such as logic gates and flip-flops interconnected in any manner necessary to perform the function of the module.

The address register and counter 14 stores addresses received from the host device via the interface circuit 10 and command register 11, and generates other addresses at the direction of the command processor 13. The address register and counter 14 comprises a counter that can be loaded from the command register 11 or command processor 13, and incremented on command from the EEPROM controller 19. As this counter also functions as an address register, the address register and counter 14 will be referred to below simply as an address counter.

The EEPROM 15 stores an instruction file 20, six-byte key data 21, a card identifier 22, and other data such as value data (not visible). The instruction file 20 comprises a list of eight-bit instruction codes, which are stored at consecutive addresses. When instructed by the EEPROM controller 19 to read data, the EEPROM 15 places the data stored at the address held in the address counter 14 on the eight-bit data bus Li. When instructed by the EEPROM controller 19 to write data, the EEPROM 15 stores the data present on the data bus Li at the address specified by the address counter 14.

Figure 2:
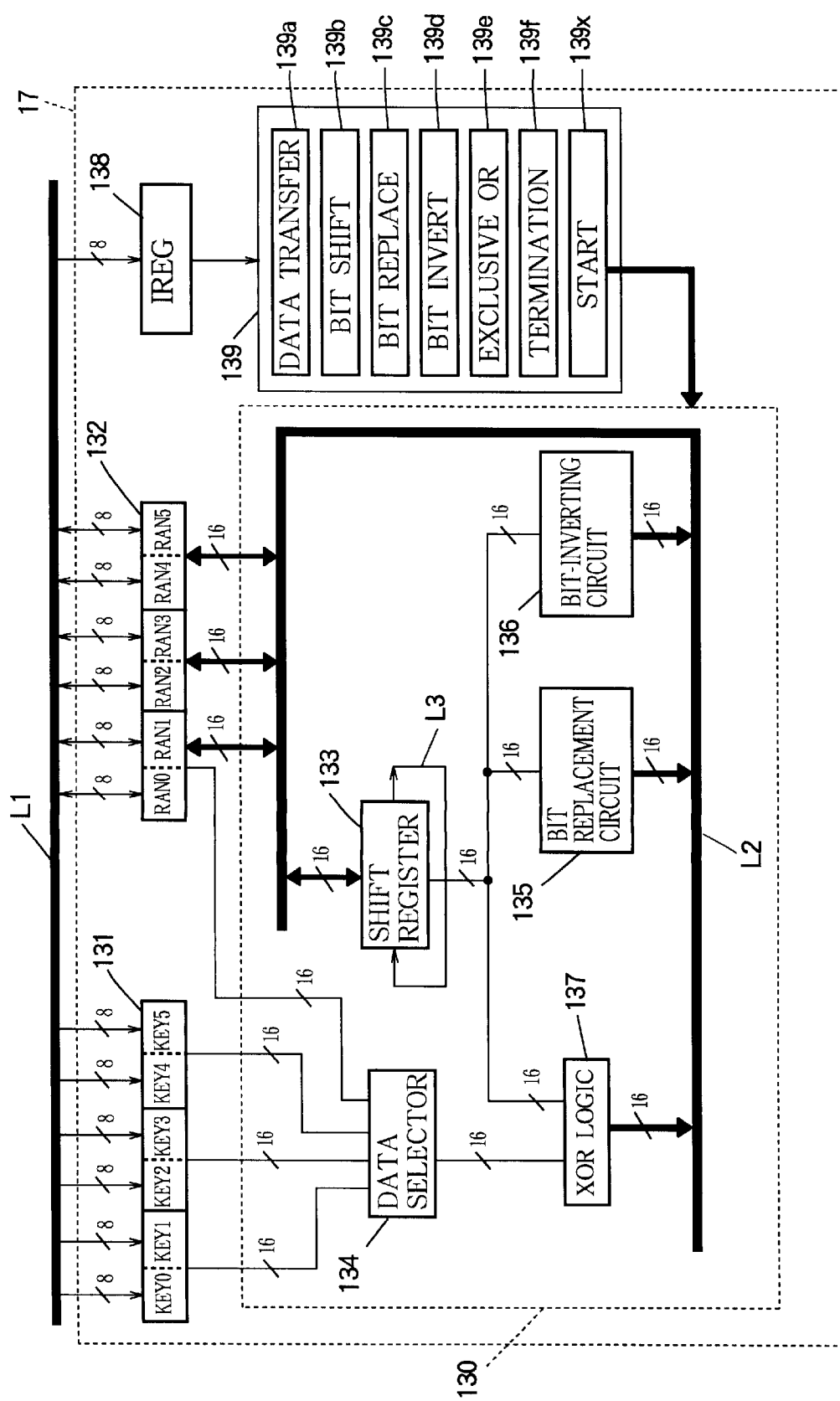
FIG. 2 is a more detailed block diagram of the authentication data generator in the first embodiment.

Referring to FIG. 2, the authentication data generator 17 in the first embodiment comprises a data processing unit 130, a six-byte key-data register 131, and a six-byte random-data register 132. The data processing unit 130 comprises a sixteen-bit shift register 133, a sixteen-bit data selector 134, a sixteen-bit bit replacement circuit 135, a sixteen-bit bit-inverting circuit 136, a sixteen-bit exclusive-OR (XOR) logic circuit 137, and a sixteen-bit local data bus L2. The authentication data generator 17 also comprises an eight-bit instruction register (IREG) 138 and a control logic circuit 139. The control logic circuit 139 comprises modules for carrying out processes that will be described below.

The key-data register 131 comprises six one-byte registers KEY0 to KEY5, each of which receives and stores one byte of key data read from the EEPROM 15. These registers are grouped into pairs, KEY0 being paired with KEY1, KEY2 with KEY3, and KEY4 with KEY5. Each register pair supplies its stored data as a sixteen-bit input to the data selector 134.

The random-data register 132 comprises six one-byte registers RAN0 to RAN5, which initially store random data. Registers RAN0 to RAN5 are coupled pair-wise to the sixteen-bit local data bus L2, RAN0 being paired with RAN1, RAN2 with RAN3, and RAN4 with RAN5. The contents of RAN0 and RAN1, comprising the least significant sixteen bits of the stored data, are also output to the data selector 134.

The shift register 133 comprises, for example, sixteen D-type flip-flop circuits (not visible) coupled in a ring, each flip-flop functioning as a bit cell. The shift register 133 is coupled to the local data bus L2, stores data received from the local data bus L2 in response to an input control signal, and shifts the stored data from one bit cell to the next in response to a shift control signal. The bit shifted out from the last or most significant cell is carried by a signal line L3 to the first or least significant cell. A bit shift moves bits from the least significant bit toward the most significant bit, with the most significant bit rotating around to the least significant position. The sixteen-bit contents of the shift register 133 are output in parallel to the bit replacement circuit 135, the bit-inverting circuit 136, and the exclusive-OR logic circuit 137, and can be read onto the local data bus L2 in response to an output control signal.

The data selector 134 selects the contents of one pair of registers, KEY0 and KEY1, KEY2 and KEY3, KEY4 and KEY5, or RAN0 and RAN1, and supplies the selected data to the exclusive-OR logic circuit 137.

The bit replacement circuit 135 replaces one or more bits in predetermined positions in the data received from the shift register 133 with predetermined values. In response to an output control signal, the bit replacement circuit outputs the resulting data to the local data bus L2. The bit replacement circuit 135 operates according to a bit replacement table such as Table 1, in which bits three and twelve are set, bit seven is cleared, and the other bits are left unchanged. (The setting and clearing of these specific bits is of course just one of many possible examples.)

TABLE 1

Bit Replacement Table (example)

| Bit No | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Replacement | — | — | — | 1 | — | — | — | 0 | — | — | — | — | 1 | — | — | — |

The bit replacement circuit 135 comprises, for example, switching elements that couple certain signal lines of the local data bus L2 (the third and twelfth signal lines in the example in Table 1) to the power supply, certain other signal lines (the seventh signal line in the example in Table 1) to ground, and the other signal lines of bus L2 to the corresponding output terminals of the shift register 133.

The bit-inverting circuit 136 inverts one or more bits in predetermined positions in the data received from the shift register 133, and outputs the resulting data to the local data bus L2. The bit-inverting circuit 136 comprises, for example, switching elements through which inverting output terminals of one or more of the bit cells in the shift register 133, and non-inverting output terminals of the other bit cells in the shift register 133, are coupled to the local data bus L2. The switching elements are controlled by an output control signal. The bit-inverting circuit 136 operates according to a bit inversion table such as Table 2, in which bits eleven and fourteen are inverted.

TABLE 2

Bit Inversion Table (example)

| Bit No. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Invert | — | — | — | — | — | — | — | — | — | — | — | Yes | — | — | Yes | — |

The exclusive-OR logic circuit 137 takes the bit-wise exclusive logical OR of the data received from the shift register 133 and the data received from the data selector 134. In response to an output control signal, the resulting data are placed on the local data bus L2.

The instruction register 138 stores an eight-bit instruction code read from the instruction file 20 in the EEPROM 15, and outputs the stored code to the control logic circuit 139.

The control logic circuit 139 comprises seven control modules: a data-transfer control module 139a, a bit-shift control module 139b, a bit-replace control module 139c, a bit-invert control module 139d, an exclusive-OR control module 139e, a termination control module 139f, and a start control module 139x.

The start control module 139x is activated by the command decoder 12 and controls the address counter 14, EEPROM 15, key-data register 131, random-data register 132, and instruction register 138. Depending on the value of the command code in the command register 11, the start control module 139x receives random data from the eight-bit data bus L1 into the random-data register 132, reads the key data 21 from the EEPROM 15 into the key-data register 131, loads the address of the first instruction in the instruction file 20 into the address counter 14, and reads the instruction from this address into the instruction register 138.

Control modules 139a to 139e in the control logic circuit 139 are activated according to the instruction code in the instruction register 138, and execute various processes by controlling the data processing unit 130 and registers 131 and 132. After executing one of these processes, each control module increments the address counter 14, then sends control signals to the EEPROM controller 19 and instruction register 138 that load the next instruction code from the instruction file 20 into the instruction register 138.

The termination control module 139f is also activated by an instruction code in the instruction register 138. The termination control module 139f sends an acknowledgment signal to the host device via the interface circuit 10, then terminates without incrementing the address counter 14.

Table 3 lists the instruction codes and their meanings.

TABLE 3

Instruction Codes

| Instruction code | | Meaning |
|---|---|---|
| Upper 4 bits | Lower 4 bits | |
| 0001 | YYXX | Transfer contents of register XX to register YY. XX and YY are interpreted as follows: 00-shift register; 01-RAN0-1; 10-RAN2-3; 11-RAN4-5. |
| 0010 | Shift length | Shift contents of shift register as specified by shift length. |
| 0011 | Don't care | Replace predetermined bit(s) in shift register with predetermined values. |
| 0100 | Don't care | Invert predetermined bit(s) in shift register. |
| 0101 | ZZZZ | Take exclusive-OR of contents of shift register and contents of register ZZZZ and store result in shift register. ZZZZ is interprted as follows: 0001-RAN0-1; 0010-KEY0-1; 0100-KEY2-3; 1000-KEY4-5. |
| 1111 | Don't care | Terminate execution of instructions in instruction file. |

When the instruction code '0001YYXX' appears in the instruction register 138, the data-transfer control module 139a generates register input and output control signals that transfer data from the shift register or register pair indicated by XX to the shift register or register pair indicated by YY. For example, if the instruction code is '00010001,' the data-transfer control module 139a sends an output control signal to registers RAN0 and RAN1 and an input control signal to the shift register 133, copying the contents of RAN0 and RAN1 into the shift register 133.

When an instruction code beginning with '0010' appears in the instruction register 138, the bit-shift control module 139b sends from zero to fifteen shift control signals to the shift register 133, as specified by the lower four bits of the instruction code, causing the contents of the shift register 133 to shift by the specified number of bits. For example, a three-bit shift is performed if the lower four bits of the instruction code are '0011,' or a five-bit shift if these bits are '0101.'

When an instruction code beginning with '0011' appears in the instruction register 138, the bit-replace control module 139c sends an output control signal to the bit replacement circuit 135 and an input control signal to the shift register 133, thereby transferring the contents of the shift register 133 to the bit replacement circuit 135, then back to the shift register 133 via the local data bus L2, with one or more predetermined bits set or cleared.

When an instruction code beginning with '0100' appears in the instruction register 138, the bit-invert control module 139d sends an output control signal to the bit-inverting circuit 136 and an input control signal to the shift register 133, thereby transferring the contents of the shift register 133 to the bit-inverting circuit 136, then back to the shift register 133 via the local data bus L2, with one or more predetermined bits inverted.

When an instruction code beginning with '0101' appears in the instruction register 138, the exclusive-OR control module 139e sends control signals to the shift register 133, data selector 134, and exclusive-OR logic circuit 137, causing the data selector 134 to select the contents of the register pair specified by the four low-order bits in the instruction register 138, the exclusive-OR logic circuit 137 to place the logical exclusive OR of the selected data and the contents of the shift register 133 on the local data bus L2, and the shift register 133 to receive and store the data from the local data bus L2.

When an instruction code beginning with '1111' appears in the instruction register 138, the termination control module 139f terminates the execution of the instruction file 20 by sending an acknowledgment signal to the host device and taking no further action.

Control modules 139a to 139f comprise simple circuits such as decoders for generating the signals described above. The circuits that load the next instruction by controlling the address counter 14, EEPROM controller 19, and instruction register 138 may be shared among control modules 139a to 139e. Detailed circuit descriptions will be omitted to avoid obscuring the invention with unnecessary detail.

Figure 3:
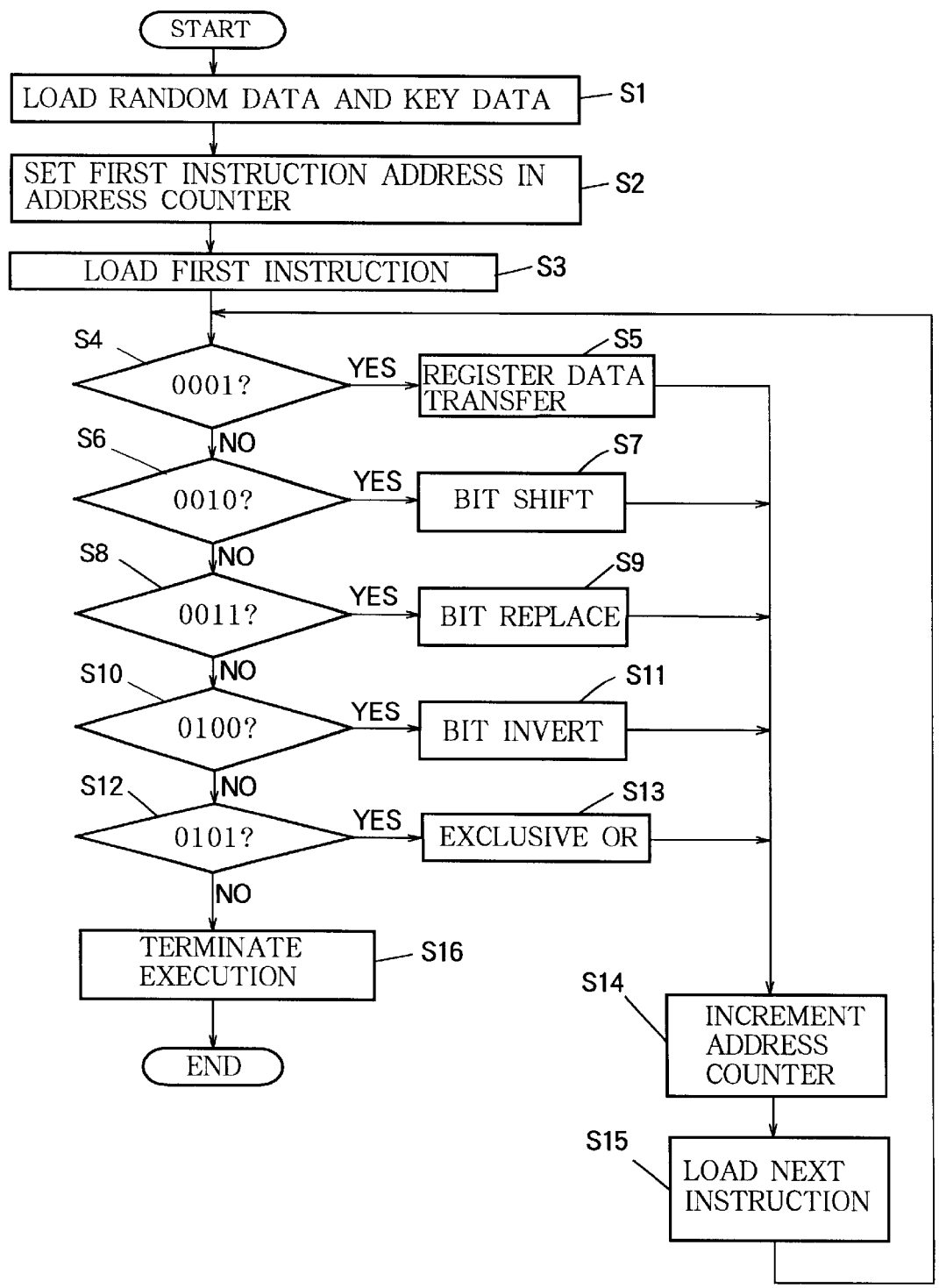
FIG. 3 is a flowchart illustrating the operation of the authentication data generator in FIG. 2.

FIG. 3 summarizes the operation of the authentication data generator 17 in the first embodiment.

In step S1, random data are placed in the random-data register 132 and key data in the key-data register 131 by the start control module 139x. In step S2, the start control module 139x sets the address of the first instruction in the instruction file 20 in the address counter 14. In step S3, the first instruction is loaded into the instruction register 138.

In the loop from step S4 to step S15, the contents of the instruction register 138 are decoded, the corresponding process is executed, and the next instruction is loaded. If the instruction code in the instruction register 138 begins with '0001' (step S4), a sixteen-bit register-to-register data transfer is executed (step S5). If the instruction code begins with '0010' (step S6), a bit-shift operation is executed (step S7). If the instruction code begins with '0011' (step S8), a bit replacement is executed (step S9). If the instruction code begins with '0100' (step S10), a bit-invert operation is executed (step S11). If the instruction code begins with '0101' (step S12), an exclusive-OR operation is executed (step S13). After any of these operations, the address counter 14 is incremented (step S14), and the EEPROM 15 is read at the new address to load the next instruction code into the instruction register 138 (step S15).

If the instruction code in the instruction register 138 does not begin with one of the five values above, then the address counter 14 is not updated and execution of the instruction file 20 terminates (step S16).

The authentication data generator 17 has certain features not found in conventional CPUs. Conventional CPUs do not, for example, have circuits that set, clear, or invert predetermined bits in a shift register. At the same time, the authentication data generator 17 lacks the general-purpose arithmetic and logic unit of a conventional CPU, and is both simpler and smaller than a conventional CPU. One of the features that simplifies the structure of the authentication data generator 17 is the use of the shift register 133 both for bit shifting and for storing the results of other operations.

The internal structure and operation of the random data generator 16, comparator 18, and EEPROM controller 19 will not be described in detail, as random number generators, comparators, and memory controllers are well known.

Next, the use of the integrated circuit 1 for authentication purposes will be described.

Before issuing a smart card in which the integrated circuit 1 is embedded, the card issuer writes the instruction file 20, key data 21, and a card identifier 22 into the EEPROM 15. After verifying that the correct data have been stored, the card issuer preferably performs further write operations that set protection flags (not shown in the drawings), protecting the instruction file 20 and key data 21 from external access. All of these operations are performed by serial data transfer through the SIO terminal.

The card identifier 22 and key data 21 are also stored in the card issuer's central computer system, which is the host device in the following description. The central computer system or host device contains a program equivalent to the instruction file 20 in the integrated circuit 1.

After the card is issued, each transaction between the card and the host device is preceded by a mutual authentication procedure. The sequence of operations by which the integrated circuit 1 verifies the authenticity of the host device will be described first.

In this sequence, the integrated circuit 1 generates and sends the host device six bytes of random data. Using the instruction file 20 and key data 21, the integrated circuit 1 also generates authentication data from the random data. Using its copy of the key data 21, the host device generates what should be identical authentication data from the same random data, and sends the generated authentication data back to the integrated circuit 1. The integrated circuit 1 compares the received authentication data with the authentication data it generated itself. The host device is presumed authentic if the authentication data match.

In more detail, the host device starts by sending the integrated circuit 1 a command instructing the integrated circuit 1 to transmit its card identifier 22. Decoding this command, the command decoder 12 activates the EEPROM controller 19, which reads the card identifier 22 from the EEPROM 15, and another module (not shown) in the command processor 13, which transfers the card identifier 22 through the interface circuit 10 to the host device.

After receiving the card identifier 22, the host device sends the integrated circuit 1 a command instructing the integrated circuit 1 to generate random data. Decoding this command, the command decoder 12 activates the random data generator 16, which generates six bytes of random data, and the start control module 139x, which loads the random data into the random-data register 132.

Next, the host device commands the integrated circuit 1 to send transmit the random data. The random data are transmitted to the host device through the interface circuit 10.

Next, the host device commands the integrated circuit 1 to generate authentication data from the random data. Decoding this command, the command decoder 12 again activates the start control module 139x, which now loads the key data 21 from the EEPROM 15 into the key-data register 131, then sets the starting address of the instruction file 20 in the address counter 14, and loads the first instruction into the instruction register 138.

By executing the instructions in the instruction file 20, the control logic circuit 139 performs operations that alter the contents of the random-data register 132. FIG. 4 shows a sample instruction file 20. The numbers at the left indicate the order of instructions. In this example, the first two instructions move the first two-byte word of random data from registers RAN0 and RAN1 into the shift register, and the second word of random data from registers RAN2 and RAN3 into registers RAN0 and RAN1. The next four instructions perform a three-bit shift operation on the first random data word, which is now stored in the shift register, followed by bit-replace and bit-invert operations, then take the logical exclusive OR of the modified data and the key data stored in registers KEY4 and KEY5. The result of this exclusive OR operation is stored in registers RAN2 and RAN3 by instruction number seven.

Instructions eight to fourteen perform similar operations on the second random data word, executing a five-bit shift instead of a three-bit shift, and storing the result in registers RAN4 and RAN5. Instructions fifteen to twenty-one perform similar operations on the third random data word, executing a seven-bit shift and using the key data in registers KEY0 and KEY1, then store the result in registers RAN0 and RAN1 and terminate execution. At this point, the contents of the random-data register 132 constitute authentication data generated from the original random data.

Execution of the end instruction also causes the integrated circuit 1 to send an acknowledgment signal to the host device. In the meantime, the host device has executed its own program to generate authentication data from the random data transmitted from the integrated circuit 1. In reply to the acknowledgment signal from the integrated circuit 1, the host device sends a command to receive and compare authentication data, then sends its version of the authentication data to the integrated circuit 1. The command decoder 12 decodes the command and activates the comparator 18, which receives the authentication data from the host device through the interface circuit 10, and compares the received authentication data with the authentication data stored in the random-data register 132. If the data do not match, the comparator 18 disables further communication between the integrated circuit 1 and the host device.

If the authentication data match, the integrated circuit 1 sends the host device an acknowledgment signal, and the host device proceeds to verify the authenticity of the integrated circuit 1. The procedure is the same, except that the host device generates the random data and makes the final comparison. Specifically, the host device sends the integrated circuit 1 a command instructing the integrated circuit 1 to receive random data. Decoding this command, the command decoder 12 activates the start control module 139x in the authentication data generator 17. As the interface circuit 10 receives each byte of random data, the start control module 139x stores the data in the random-data register 132. A further command from the host device causes the integrated circuit 1 to generate authentication data from the random data. The authentication data are generated as described above, using the instruction file 20 and key data 21 in the EEPROM 15. The host device then sends a further command, causing the integrated circuit 1 to transfer its authentication data from the random-data register 132 to the interface circuit 10 a byte at a time, and transmit the authentication data to the host device.

If the authentication data transmitted from the integrated circuit 1 to the host device match the authentication data the host device generates itself from the same random data, the integrated circuit 1 is presumed authentic, and the host device sends further commands that read, write, or modify value data or other user data stored in the EEPROM 15. These further commands are executed by, for example, having the EEPROM controller 19 read and write data in the EEPROM 15 at addresses supplied by the host device. If the host device sends an address of data in the instruction file 20 or key data 21, however, the EEPROM controller 19 refuses to access the data and disables further communication, thereby protecting the instruction file 20 and key data 21 from being read or tampered with by any device external to the integrated circuit 1.

As illustrated by the sample instruction file 20 in FIG. 4, the instruction set of the first embodiment is powerful enough to permute the order of the three random data words, shift the bits in each word, set, invert, and clear arbitrary bits, and combine a random data word with selected key data by exclusive-OR logic. Other operations, such as exclusive-OR operations on two random data words, are also possible. In addition, the end instruction permits the instruction file 20 to have an arbitrary length, so that operations of considerable complexity can be carried out. A instruction file 20 comprising one or two hundred instructions, for example, can make it extremely difficult for a potential attacker to decipher the inner working of the algorithm, even if the attacker repeatedly observes input random data and resultant authentication data.

Next, the second embodiment will be described. The second embodiment adds further instructions to the instruction set of the first embodiment.

Figure 5:
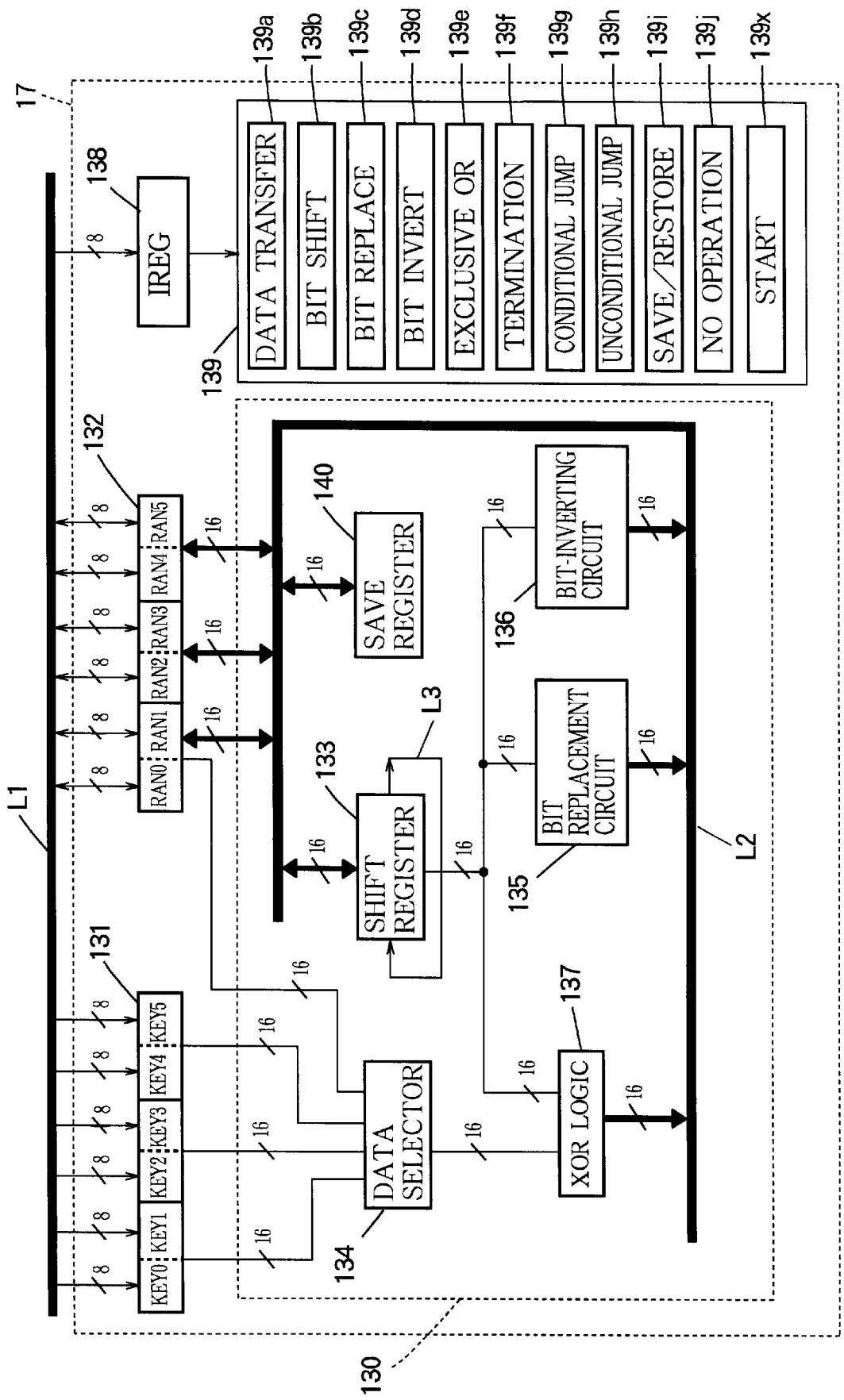
FIG. 5 is a more detailed block diagram of the authentication data generator in the second embodiment.

FIG. 5 shows the authentication data generator 17 in the second embodiment, using the same reference numerals as in FIG. 2 for identical or similar elements. The data processing unit 130 differs from the data processing unit in the first embodiment in having an additional sixteen-bit save register 140, which is coupled to the local data bus L2. The control logic circuit 139 differs from the control logic circuit in the first embodiment in having four additional control modules: a conditional jump control module 139g, an unconditional jump control module 139h, a save-restore control module 139i, and a no-operation control module 139j.

In addition to the instructions executed by the first embodiment, the control logic circuit 139 in the second embodiment executes a conditional jump instruction, an unconditional jump instruction, and register save and restore instructions. These instructions are summarized in Table 4.

TABLE 4

Additional Instruction Codes

| Instruction code | | |
| --- | --- | --- |
| Upper 4 bits | Lower 4 bits | Meaning |
| 0110 | 00XX | Increment address counter twice if bit W of register XX is set to 1. The meaning of XX is: 00-shift register; 01-RAN0; 10-RAN2; 11-RAN4. |
| 0111 | Don't care | Increment address counter once. |
| 1000 | YYXX | Transfer contents of register XX to register YY. The meaning of XX and YY is: 00-shift register; 01-save register. |

When an instruction code beginning with '0110' appears in the instruction register 138, the conditional jump control module 139g tests a predetermined bit W (for example, the least significant bit) in the register specified by the two least significant bits in the instruction register 138. If this bit W is set to one, the conditional jump control module 139g increments the address counter 14 twice, thereby skipping the next two instructions. Upon completion of this instruction, the address counter 14 is incremented again, so in all, the address counter 14 is incremented three times.

When an instruction code beginning with '0111' appears in the instruction register 138, the unconditional jump control module 1399h unconditionally increments the address counter 14 once, thereby skipping the next instruction. Upon completion of this instruction, the address counter 14 is incremented again, so in all, the address counter 14 is incremented twice.

When an instruction code beginning with '1000' appears in the instruction register 138, if the instruction code ends in '0100,' the save-restore control module 139i saves the contents of the shift register 133 into the save register 140. If the instruction code ends in '0001,' the save-restore control module 139i restores the contents of the save register 140 to the shift register 133. The address counter 14 is incremented on completion of this instruction.

When an instruction code not matching any of the instruction codes in Tables 3 and 4 appears in the instruction register 138, the no-operation control module 139j performs no operation, but upon completion of this non-operation, the address counter 14 is incremented, and the next instruction in the instruction file 20 is executed.

Figure 6:
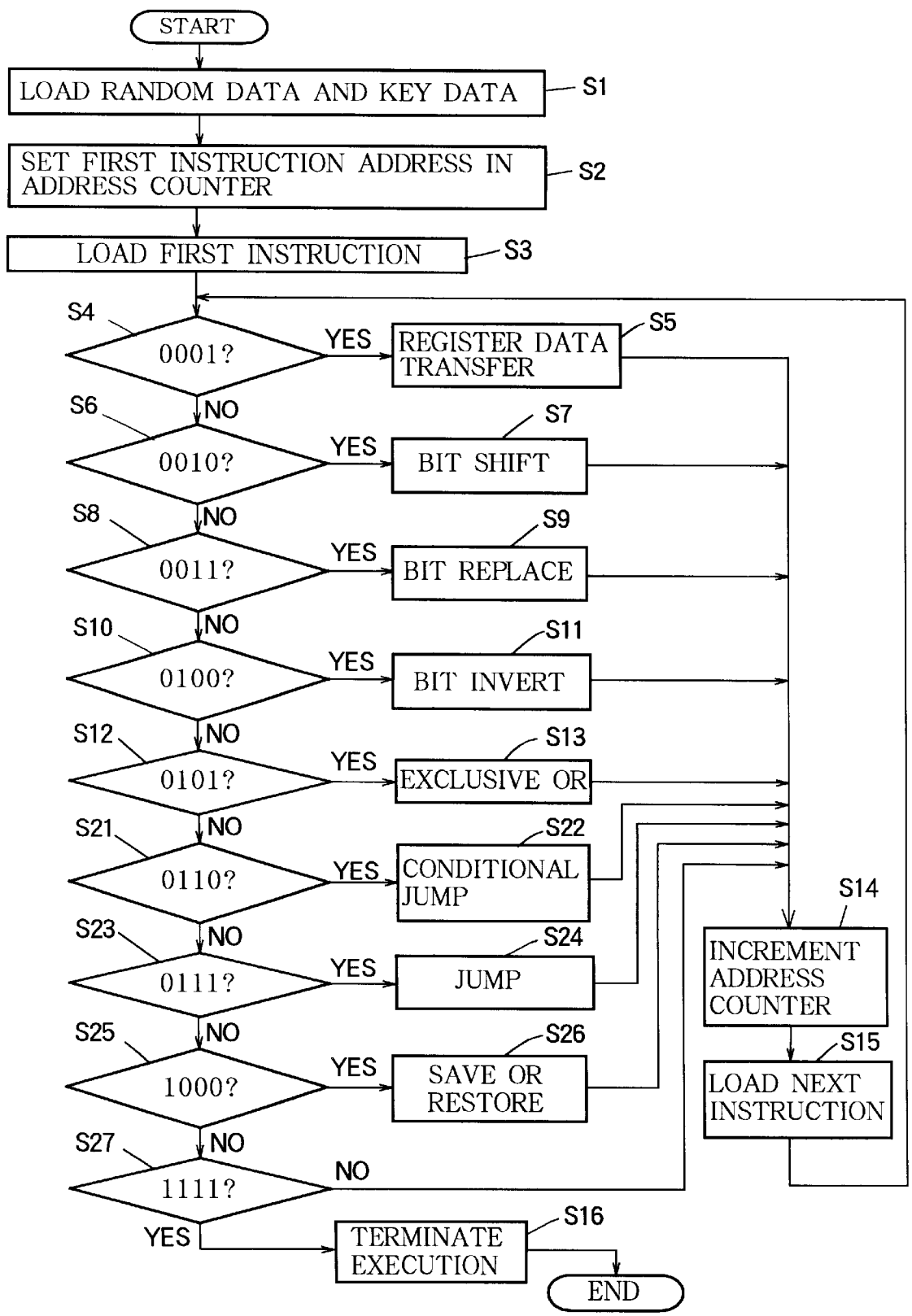
FIG. 6 is a flowchart illustrating the operation of the authentication data generator in FIG. 5.

FIG. 6 summarizes the operation of the authentication data generator 17 in the second embodiment. Steps S1 to S16 are the same as in the first embodiment, so only the additional steps will be described.

If the instruction code in the instruction register 138 begins with '0110' (step S21), a conditional jump is executed by the conditional jump control module 139g as described above (step S22). If the instruction code begins with '0111' (step S23), an unconditional jump is executed by the unconditional jump control module 1399h (step S24). If the instruction code begins with '1000' (step S25), the contents of the shift register 133 are saved or restored (step S26). Following each of these three instructions, the address counter is incremented (step S14) and the next instruction is loaded (step S15). If the instruction code begins with '1111' (step S27), execution of the instruction file 20 terminates (step S16). If the instruction code does not begin with any of the four-bit values shown in FIG. 6, then no operation is performed, but the address counter 14 is incremented (step S14), the next instruction is loaded (step S15), and execution continues.

FIG. 7 shows a sample fragment of an instruction file 20 employing the jump instructions. Instruction number k is a conditional jump instruction; instruction number k+2 an unconditional jump instruction; k is an arbitrary integer. Depending on the value of bit W of the shift register 133, the contents of the shift register 133 are shifted by either three bits (instruction k+1) or eight bits (instructi k+3). An exclusive-OR operation is then performed on t shifted contents of the shift register 133 and the contents of registers KEY0 and KEY1 (instruction k+4

FIG. 8 shows a sample fragment of an instruction file 20 employing the save and restore instructions. In this fragment, the data currently stored in registers RAN0 and RAN1 are copied to the shift register 133 (instruction k), then saved into the save register 140 (instruction k+1 Next, the shift register is cleared (instruction k+2). he first word of key data is copied by an exclusive-OR operation (instruction k+3) froregisters KEY0 and KEY1 to the shift register 133, where a bit replacement is performed (instruction k+4) tmodify the key data value. The modified key value is then moved into registers RAN0 and RAN1 (instruction k+, the original contents of registers RAN0 and RAN1 are restored from the save register 140 to the shift register 133 (instruction k+6), and an exclusive-operation is performed on the original contents of registers RAN0 and RAN1 and the modified key value (instruction k+7

The save register 140 has other uses as well. For example, random data can be moved into the shift register 133, modified in a first way, saved into the save register 140, then modified in a second way, after which the second modified random data can be stored in registers RAN0 and RAN1, the first modified random data can be restored to the shift register 133, and the two modified random values can be combined by exclusive-OR logic.

By allowing data to be saved and restored, and by allowing the flow of instruction execution to be altered according to bit values, the second embodiment permits the creation of complex algorithms that will defeat determined decipherment attempts. To make decipherment still more difficult, the second embodiment allows instruction files to be padded with a variety of dummy instructions that perform no actual operation, to disguise the true length and complexity of the algorithms even from an attacker who manages to obtain a copy of the instruction file. (In the first embodiment, the only no-operation instruction is the zero-bit shift instruction.)

Needless to say, further modifications can be made to the data processing unit 130 and control logic circuit 139 to increase the complexity of the data processing, hence the security of the authentication procedure. For example, the four lower bits of the bit-replace instruction can be used to specify different sets of bits to be set or cleared by the bit replacement circuit 135. That is, the bit replacement circuit 135 can operate according to one of several different bit replacement tables, as selected by the bit-replace control module 139c according to the four lower instruction bits. Similarly, the four lower bits of the bit-invert instruction can be used to specify different bit inversion tables for the bit-inverting circuit 136; the four lower bits of the unconditional jump instruction can be used to specify the length of the jump; the save-restore instruction can be allowed to transfer data directly between the save register 140 and the random-data register 132; and bit-swapping operations and many other conceivable operations can be added.

Even the comparatively simple data processing units of the first and second embodiments, however, are adequate to provide a high level of security, at a lower manufacturing cost than that of a conventional smart card employing an integrated circuit with a CPU. A major reason is that besides storing different key data in every card, the card issuer can store different instruction files in different cards, so that the issued cards do not all execute the same algorithm. No-operation instructions are preferably inserted to give each algorithm the same apparent length. If some instructions execute more slowly than others, no-operation instructions can be inserted to make each algorithm execute in the same number of clock cycles.

The card issuer's central computer system or host system must, of course, store equivalent algorithms, together with the card identification numbers of the cards executing each algorithm.

For further security, each card preferably stores two different instruction files, one used for authenticating the card, the other for authenticating the host system. Separate key data can also be stored for these two purposes.

More generally, each card can store a plurality of instruction files, which are selected according to commands or other information received from the host device. Different instruction files can also be selected according to the values of predetermined bits in the random data. A plurality of key data can likewise be stored and selected.

The length of the key data is not limited to six bytes, the length of the random data is not limited to six bytes, and the length of the shift register and other logic circuits in the data processing unit is not limited to sixteen bits.

A card issuer may choose not to write-protect the key data and instruction file, so that the contents of the key data and instruction file can be altered after the card is issued, or so that the card can be re-issued.

Those skilled in the art will recognize that further variations are possible within the scope claimed below.

What is claimed is:

1. An integrated circuit embedded in a smart card, providing an authentication function by generating authentication data from random data, comprising:

an interface circuit that receives and generates commands and data, said data including said random data and authentication data;

an electrically rewritable non-volatile memory that stores at least one instruction file having a list of instructions; and an authentication data generator, coupled to said interface circuit and said rewritable non-volatile memory, having logic circuits that execute said instructions to thereby convert said random data into said authentication data, in response to a command received by said interface circuit.

2. A method of issuing smart cards with embedded integrated circuits of the type in claim 1, comprising the step of writing different instruction files in the electrically rewritable non-volatile memories of the integrated circuits embedded in different ones of said smart cards.

3. The method of claim 2, further comprising the step of inserting no-operation instructions into said instruction files so that all of said instruction files have identical lengths.

4. The method of claim 2, wherein said instruction files are used to authenticate host devices communicating with said smart cards, further comprising the step of writing separate instruction files in said rewritable non-volatile memories for use in authenticating said smart cards.

5. The integrated circuit of claim 1, wherein said electrically rewritable non-volatile memory stores a plurality of instruction files with different lists of instructions for generating said authentication data.

6. The integrated circuit of claim 5, wherein said authentication data generator selects one of said instruction files according to information received by said interface circuit.

7. The integrated circuit of claim 5, wherein said authentication data generator selects one of said instruction files according to values of predetermined bits in said random data.

8. The integrated circuit of claim 5, further comprising a random data generator that generates said random data.

9. The integrated circuit of claim 8, wherein said authentication data generator, in response to commands received by said interface circuit, selects one of said instruction files and generates said authentication data from the random data generated by said random data generator, and selects another one of said instruction files and generates said authentication data from said random data when said random data are received through said interface circuit.

10. The integrated circuit of claim 1, wherein said electrically rewritable non-volatile memory also stores key data used in generating said authentication data from said random data.

11. An integrated circuit, embedded in a smart card, that generates authentication data from random data, comprising:

an interface circuit that receives and generates commands and data, said data including said random data and authentication data;

an electrically rewritable non-volatile memory that stores at least one instruction file having a list of instructions; and an authentication data generator, coupled to said interface circuit and said rewritable non-volatile memory, having logic circuits that execute said instructions, to thereby convert said random data into said authentication data, in response to a command received by said interface circuit, wherein said electrically rewritable non-volatile memory also stores key data used in generating said authentication data from said random data, and wherein said authentication data generator [17] comprises:

a first register, a second register, a start control module that stores said key data in said first register and said random data in said second register, in response to a command received by said interface circuit, a data processing unit that performs operations on the data stored in said second register, using the data stored in said first register, an instruction register that stores an instruction read from said instruction file, and a control logic circuit that reads instructions one by one from said instruction file into said instruction register, executes each instruction thus read by controlling said data processing unit, to thereby generate said authentication data, and store said authentication data in said second register.

12. The integrated circuit of claim 11, wherein said data processing unit comprises:

a shift register that stores data and performs bit-shift operations on the stored data;

a bit replacement circuit that replaces predetermined bits of the data stored in said shift register with predetermined values;

a bit-inverting circuit that inverts predetermined bits of the data stored in said shift register;

a data selector that selects data from said first register and said second register; and an exclusive-OR logic circuit that performs a logical exclusive OR operation on the data stored in said shift register and the data selected by said data selector.

13. The integrated circuit of claim 12, wherein said control logic circuit comprises:

a data-transfer control module that transfers data between said second register and said shift register;

a bit-shift control module that causes said shift register to perform said bit shift operations;

a bit-replacement control module that transfers output data from said bit replacement circuit to said shift register;

a bit-inverting control module that transfers output data from said bit-inverting circuit to said shift register;

an exclusive-OR control module that controls said data selector and transfers output data from said exclusive-OR logic circuit to said shift register; and a termination control module that terminates execution of said instruction file.

14. The integrated circuit of claim 13, wherein said control logic circuit further comprises:

a conditional jump control module that conditionally skips instructions in said instruction file, according to a value of a bit in a specified one of said second register and said shift register; and an unconditional jump control module that unconditionally skips a following instruction in said instruction file.

15. The integrated circuit of claim 13, wherein:

said data processing unit further comprises a save register; and said control logic circuit further comprises a save-restore control module that transfers data between said shift register and said save register.

16. The integrated circuit of claim 13, wherein said control logic circuit further comprises an operation control module that executes certain instructions read from said instruction file by performing an operation, then loads a following instruction from said instruction file into said instruction register.

17. The integrated circuit of claim 13, wherein said bit replacement circuit operates according to a plurality of bit replacement tables, as selected by said bit-replace control module according to the instruction stored in said instruction register.

18. The integrated circuit of claim 13, wherein said bit-inverting circuit operates according to a plurality of bit inversion tables, as selected by said bit-invert control module according to the instruction stored in said instruction register.

19. A semiconductor integrated circuit for an IC card, comprising:

an interface circuit that receives random data having a plurality of bits and outputs authentication data having a plurality of bits;

a rewritable non-volatile memory that stores an instruction file including a list of instructions; and an authentication data generator, coupled to said interface circuit and said non-volatile memory, that changes the bits of the random data received by said interface circuit according to the instructions stored in said rewritable non-volatile memory, to thereby convert the random data into the authentication data.

20. A semiconductor integrated circuit according to claim 19, wherein the instructions stored in said rewritable non-volatile memory include a bit shift, a bit replace, and a bit invert.

* * * * *